(12) United States Patent
Schmitz et al.

(10) Patent No.: US 11,828,716 B2
(45) Date of Patent: Nov. 28, 2023

(54) METHOD AND DEVICE FOR DETERMINING THE MATERIAL MOISTURE OF A MATERIAL

(71) Applicant: Rheinmetall Waffe Munition GmbH, Unterlüß (DE)

(72) Inventors: Jürgen Schmitz, Gifhorn (DE); Markus Jung, Unterlüß (DE); Michael Camp, Celle (DE); Katrin Linke, Braunschweig (DE)

(73) Assignee: Rheinmetall Waffe Munition GmbH, Unterlüß (DE)

( * ) Notice: Subject to any disclaimer, the term of this patent is extended or adjusted under 35 U.S.C. 154(b) by 192 days.

(21) Appl. No.: 17/603,990

(22) PCT Filed: Mar. 16, 2020

(86) PCT No.: PCT/EP2020/057030
§ 371 (c)(1),
(2) Date: Oct. 15, 2021

(87) PCT Pub. No.: WO2020/216528
PCT Pub. Date: Oct. 29, 2020

(65) Prior Publication Data
US 2022/0196574 A1 Jun. 23, 2022

(30) Foreign Application Priority Data

Apr. 24, 2019 (DE) ...................... 10 2019 110 537.4

(51) Int. Cl.
*G01N 22/04* (2006.01)
(52) U.S. Cl.
CPC .................. *G01N 22/04* (2013.01)
(58) Field of Classification Search
CPC ...................................................... G01N 22/04
See application file for complete search history.

(56) References Cited

U.S. PATENT DOCUMENTS

| 5,397,993 A | 3/1995 | Tews et al. |
| 9,377,417 B2* | 6/2016 | Herrmann ............... G01N 22/04 |

(Continued)

FOREIGN PATENT DOCUMENTS

| CH | 604163 A5 | 8/1978 |
| DE | 42 24 128 A1 | 2/1994 |

(Continued)

OTHER PUBLICATIONS

International Search Report from corresponding PCT Application No. PCT/EP2020/057030, dated Jul. 3, 2020.

(Continued)

*Primary Examiner* — Jermele M Hollington
*Assistant Examiner* — Zannatul Ferdous
(74) *Attorney, Agent, or Firm* — Harness, Dickey & Pierce, P.L.C.

(57) ABSTRACT

The invention relates to a method for determining the material moisture of a material, comprising the following steps: referencing a material using a referencing device by determining the material moisture of a material sample of the material in accordance with the mass of the material sample; determining the dielectric material constant (DProbe) of the material sample in accordance with the material moisture; calibrating a first microwave sensor using the dielectric material constant of the material sample; measuring the dielectric material constant of the material online by means of the first microwave sensor; determining the material moisture of the material using the dielectric material constant previously measured online.

14 Claims, 7 Drawing Sheets

(56) References Cited

U.S. PATENT DOCUMENTS

| | | | | |
|---|---|---|---|---|
| 2004/0012912 A1* | 1/2004 | Rombach | ............ | G01N 27/223 |
| | | | | 361/321.6 |
| 2013/0025350 A1* | 1/2013 | Nagata | ................ | G01N 33/346 |
| | | | | 73/73 |
| 2016/0255763 A1* | 9/2016 | Canyon | ................ | A01B 79/005 |

FOREIGN PATENT DOCUMENTS

| | | |
|---|---|---|
| DE | 10204328 A1 | 6/2003 |
| DE | 102 46 260 A1 | 4/2004 |
| DE | 102005013647 B3 | 8/2006 |
| WO | WO-0014552 A1 | 3/2000 |

OTHER PUBLICATIONS

J Mellmann et al. "Development of the Heat and Mass Transfer Model for Mixed-Flow Grain Dryer", *Proceedings of the 17th World Congress the International FEDERAT/011/ of Automatic Control*, Seoul, Korea, Jul. 6, 2008 (Jul. 6, 2008), pp. 9591-9595.

\* cited by examiner

METHOD AND DEVICE FOR DETERMINING THE MATERIAL MOISTURE OF A MATERIAL

CROSS-REFERENCE TO RELATED APPLICATIONS

This application is a national phase application of PCT Application No. PCT/EP2020/057030, filed on 16 Mar. 2020, which claims the benefit of and priority to German Patent Application No. 10 2019 110 537.4, filed on 24 Apr. 2019. The entire disclosures of the applications identified in this paragraph are incorporated herein by references.

FIELD

The invention relates to a method for determining the moistness of a material.

The invention further relates to a device for determining the moistness of a material.

BACKGROUND

The material in question preferably comprises bulk material or solid bodies, more particularly a pyrotechnic and/or explosive substance.

Producing the majority of industrial powders and bulk materials is a sensitive operation, in which slight changes in the physical parameters can lead to considerable differences in the quality. One of the important physical parameters is the moistness. In the production operation, fluctuations in the moistness result in the desired product quality being jeopardized.

In order to obtain a desired moistness, such substances are dried. For the drying there are a variety of methods available, examples being air drying (desiccation or maturation), freeze drying, microwave drying, condensation methods, etc.

In principle every drying operation requires defined input variables, such as moistness before and at the end of the drying operation, in order to be able to set operational parameters such as the required energy. The residual moistness in a material may be determined via various methods, with a fundamental distinction being made between the direct and the indirect drying methods.

In the case of the desiccation-weighing method, which represents a direct method, the sample is dried, and the moistness of the sample is determined via the loss in mass. Disadvantages of this method are the long drying time and the need for the sample to be taken with attendant destruction. Methods of this kind are set out for example in K. Kuper: Materialfeuchtemessung, Expert Verlag, 1997, or in W. Lück: Feuchtigkeit, Grundlagen, Messen, Regeln, Oldenbourg Verlag, 1964.

In the case of the indirect methods, changes in the physical properties are considered in connection with the moistness. Typical properties include weight, volume, electrical conductivity, relative permittivity, etc. In the case of low-frequency methods and methods based on a measurement of the conductivity, in comparison to high-frequency methods in the microwave range, are not nondestructive. A further disadvantage is that low-frequency methods exhibit an increased susceptibility to disruption, owing to the ionic influence of water. A key advantage of the indirect methods is that the measuring times are reduced by some orders of magnitude by comparison with direct methods.

The most suitable among the indirect measuring methods are those methods which are based on microwaves.

Microwave measuring methods for determining the moistness of material come under the heading of dielectric methods. These methods are based on the dielectric properties of water, which is a polar molecule, meaning that the focal points of charge within the molecule are not locally coincident. Accordingly, in a field applied from the outside, the water molecule adopts an orientation in a preferential direction. In other words, water molecules are polarizable. When an alternating electromagnetic field of this kind is applied, the molecules rotate at the frequency of the field. This phenomenon is also called orientation polarization. For water, this dielectric effect is so pronounced that even small quantities of water can be reliably detected.

DE 42 24 128 A1 discloses a method for determining moisture content of clay material and similar shapable compositions for the production of ceramic products, and a charging device on which the method is carried out.

DE 102 46 260 A1 discloses a device for regulating moistness, more particularly for regulating the moistness of a bulk material, such as of wheat in a milling plant, for example.

DE 91 06 191 U1 discloses a device for measuring moistness of coarse and fine bulk materials in online operation. The device comprises a microwave measuring sensor and a signal processing unit and also a controlling computer. For the correction of the measurement signal, the temperature and the conductivity of the material under measurement are by a temperature sensor and a conductivity sensor. A disadvantage in this case is the need for two additional measured variables to be measured online by two further sensors. This has proven to have little practicability.

SUMMARY

On this basis, the problem addressed by the invention is that of providing a method permitting reliable determination of the moistness of a material.

This problem is solved by the features of claim 1 and also of claim 8. Advantageous embodiments and developments are subjects of the respective dependent claims.

The invention provides a method for determining the moistness of a material, comprising the following steps, preferably in the following order:

referencing a material with a referencing device by determining the moistness of a sample of the material as a function of the mass of the sample; determining the dielectric constant of the sample as a function of the moistness; calibrating a first microwave sensor, on the basis of the dielectric constant of the sample; measuring the dielectric constant of the material online by means of the first microwave sensor; determining the moistness of the material on the basis of the dielectric constant measured online previously.

The invention further provides a device for determining the moistness of a material, comprising a referencing device for referencing a material by determining the moistness of a sample of the material as a function of the mass of the sample, a microwave measuring facility for determining the dielectric constant of the sample as a function of the moistness; a controlling and evaluating facility which is configured to calibrate a first microwave sensor on the basis of the dielectric constant of the sample, a first microwave sensor disposed online for measuring the dielectric constant of the material, wherein the controlling and evaluating facility is further configured to determine the moistness of the material on the basis of the dielectric constant measured online previously.

The method is carried out preferably by means of a device comprising at least a microwave sensor and at least a controlling and evaluating facility.

The method may preferably provide that the step of referencing the material with a referencing device takes place offline.

It may further be provided that the referencing device for referencing the material is disposed offline.

The dielectric constant of the sample as a function of the moistness is determined here with a microwave measuring facility.

When the dielectric constant of the sample has been determined, it is stored.

The step of determining the moistness of the material is carried out on the basis of the dielectric constants measured online previously, preferably by a controlling and evaluating facility.

The material K is preferably a bulk material or solid body, more particularly a pyrotechnic and/or explosive substance.

By virtue of the weak transmitting energy used, the use of microwave measuring sensors has the advantage that there is no change in or warming of material, with a consequent minimization of any risk of the material or the measuring procedure per se being adversely affected.

Determining the dielectric constants may be carried out, for example, by a high-frequency measurement method, with, for example, the Bischoff method or a Vincent method as a conduction-based 2-port method with a vector network analyzer.

Online in the sense of the invention means that this takes place along a production line, drying line, transport line or other line. Offline means that measuring or the like takes place independently of any such line.

The measuring sensor to be calibrated may be either a resonant 1-port or a transmitting 2-port microwave measuring sensor, which performs contactless measurement of the dielectric constants and hence of the moistness. The nature of the microwave sensor is such that measurement and evaluation can take place in real time. The measurement and the control of the operating parameters can be set via microcontrollers embedded into the evaluating and controlling unit.

The referencing step may take place, for example, according to a desiccation-weighing method.

As a result of the embodiment in accordance with the invention, contactless and nondestructive measurement of the residual moistness is possible in real time. In accordance with the invention, therefore, a real-time measurement of the moistness via the electrical indicators of the material is possible. On the basis of the method of the invention and of the device of the invention, operational setting and validation of the residual moisture content are possible.

In advantageous development of the method, provision may be made that the method further comprises the following steps: measuring the dielectric constant of the material online by means of a second microwave sensor; redetermining the moistness of the material on the basis of the dielectric constant measured online previously.

In embodiment of the device, provision may be made for the device to have a second microwave sensor disposed online for measuring the dielectric constant of the material, and for the controlling and evaluating facility to be configured to determine the moistness of the material on the basis of the dielectric constant measured online previously.

The step of redetermining the moistness of the material on the basis of the dielectric constant measured online previously is carried out by the controlling and evaluating facility.

The steps of measuring online by means of the second microwave sensor and of redetermining the moistness of the material take place after the first determination of the moistness.

The effect of this is that measurement is carried out a further time and the moistness is determined.

In embodiment of the method, provision may be made that the method further comprises the following step: validating the moistness on the basis of the dielectric constant, measured by the second microwave sensor, by the controlling and evaluating facility.

For this purpose, the moisture content is validated on the basis of the two measured moisture content values. The controlling and evaluating facility is configured to carry out such validation. For this purpose, it compares the first and second dielectric constants measured online. By this means, the first and second moisture content values determined are placed in relation to one another—that is, compared.

If there is no microwave drying device disposed between the first the first microwave sensor and the second microwave sensor, the moisture content values measured ought to be the same. In this case, therefore, the controlling and evaluating facility compares the two measured moisture content values to that effect.

If there is a microwave drying device disposed between the the first the first microwave sensor and the second microwave sensor, the moisture content value measured later ought to correspond to a mandated setpoint value. Accordingly, the controlling and evaluating facility compares the measured value with the setpoint value.

In advantageous development of the device, provision may be made for the controlling and evaluating facility to be configured to validate the moistness.

The effect of this is that it is ascertained whether the moistness determined has also been correctly determined. Where differences or errors arise, this is recognized.

The validating step here takes place after the redetermining of the moistness of the material.

The step of validating the moistness on the basis of the dielectric constant measured by the second microwave sensor is carried out by the controlling and evaluating facility.

The method may preferably further comprise the following step: drying the material, more particularly between the step of determining the moisture content of the material and the online measuring of the dielectric constant of the material by means of the second microwave sensor.

The device may be embodied such that it a microwave drying device for drying the material, said device being disposed preferably online between the first microwave sensor and the second microwave sensor.

The step of drying the material is carried out preferably with a microwave drying device.

In embodiment, the method and/or the device may provide for the dielectric constants to be permeability and/or permittivity.

In embodiment of the device, provision may be made for the dielectric material constants to be permeability and/or permittivity.

The invention further provides a drying method comprising at least a drying facility for drying a material, wherein the drying method comprises an above-described method for determining the moistness of a material, wherein the drying facility is controlled or regulated on the basis of the moistness determined for the material.

Moreover, the invention provides a drying device for drying a material, wherein the drying device a device for determining the moistness of material an above-described device, wherein the drying facility is configured to be controlled or regulated on the basis of the moistness determined for the material.

In accordance with the invention, therefore, the drying parameters within the drying method and, respectively, within the drying device may be controlled or regulated, so that a fully automated drying operation plus validation is provided. In this way it is possible to achieve savings both in time and in costs, as the drying operation is able to proceed entirely automatically.

For this purpose, drying parameters such as, for example, power, energy and transit velocity in the case of a conveyor belt-like arrangement are set.

BRIEF DESCRIPTION OF THE DRAWINGS

The intention of the text below is to illustrate the invention on the basis of working examples, with reference to the drawings.

In the drawings.

DETAILED DESCRIPTION

Figure 1:
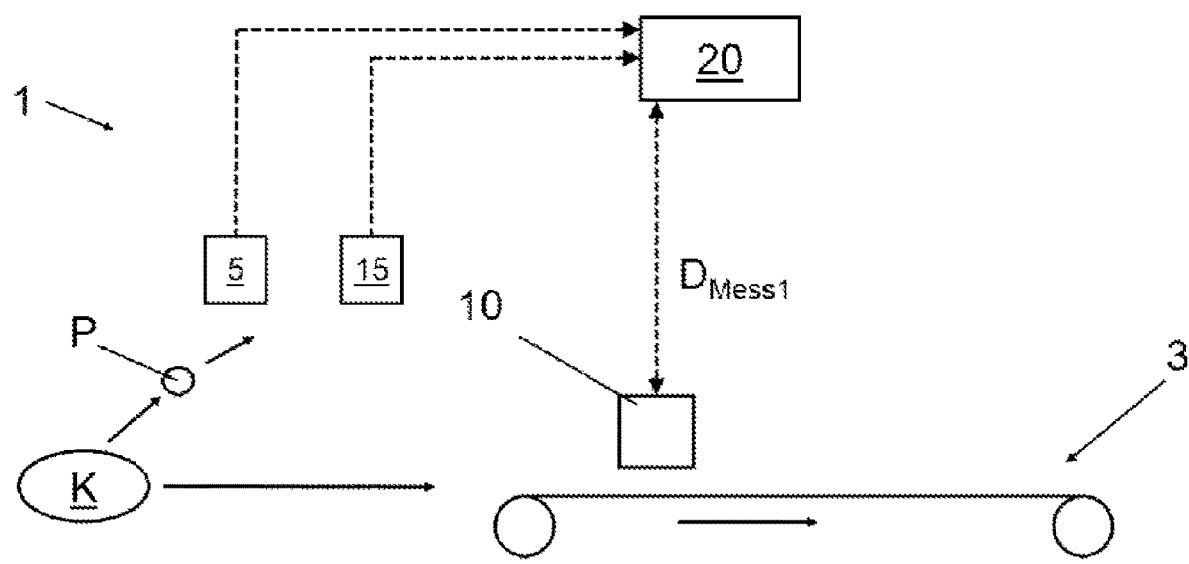
FIG. 1 shows a schematic representation of a device for determining the moistness of a material according to one embodiment of the invention.

FIG. 1 shows an inventive embodiment of a device 1 for determining the moistness of bulk material or solid bodies K, more particularly of pyrotechnic and/or explosive substances. The device 1 comprises a referencing device 5, which for referencing a material by determining the moistness of a sample P of the material K as a function of the mass of the sample P. In accordance with this embodiment, the referencing device is a desiccation-weighing device with which the moistness of the sample P can be determined as a function of its mass. The referencing device 5 is in this case disposed offline.

Figure 5:
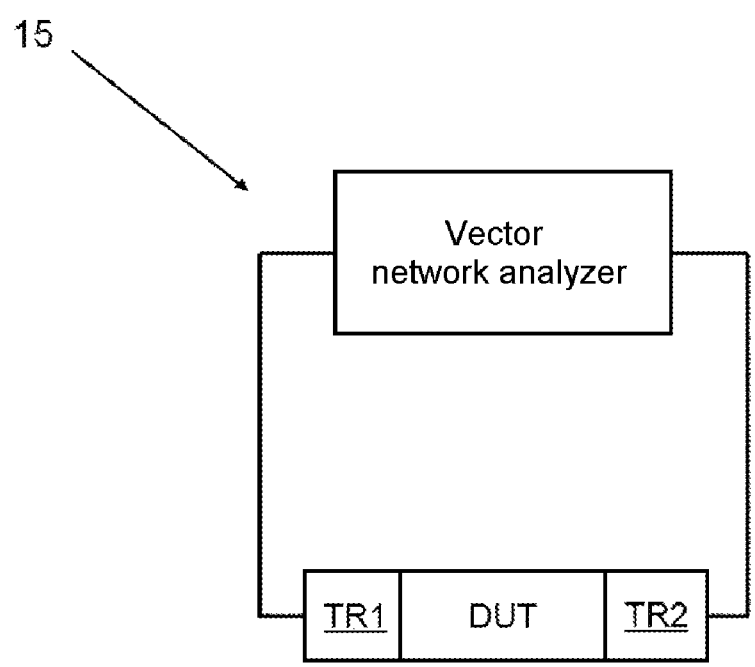
FIG. 5 shows a schematic representation of a microwave measuring unit.

Moreover, the device 1 has a microwave measuring facility 15 for determining the dielectric constant DProbe of the sample P as a function of the moistness. The microwave measuring facility 15 is configured to determine dielectric constant DProbe of the sample P as a function of the moistness, on the basis of the moistness determined previously by the referencing device 5. The construction of the microwave measuring facility 15 is represented in FIG. 5 and is described below for FIG. 5.

The device 1 additionally has a controlling and evaluating facility 20. The controlling and evaluating facility 20 is operatively connected to the referencing device 5 and to the microwave measuring facility 15. The data obtained by the referencing device 5 are transmitted to the controlling and evaluating facility 20, where they can be stored. For this purpose, the controlling and evaluating facility 20 has at least one memory. Similarly, the data obtained by the microwave measuring facility 15 are transmitted to the controlling and evaluating facility 20, and can be stored there.

The device has a first microwave sensor 10 disposed online. Said sensor is designed for measuring the dielectric constant $D_{mess1}$ of the material K. Said sensor is disposed preferably on a production line 3 of the material K along which the material K is transported. The microwave sensor 10 is operatively connected to the controlling and evaluating facility 20, and the controlling and evaluating facility 20 is configured to calibrate the first microwave sensor 10 on the basis of the dielectric constant of the sample P by the microwave measuring facility 15.

The controlling and evaluating facility 20 is further configured to determine the moistness of the material K on the basis of the dielectric constant $D_{mess1}$ measured online previously by the first microwave sensor 10.

The device 1 additionally has a second microwave sensor 30 disposed online. Said sensor is designed for measuring the dielectric constant $D_{mess2}$ of the material K. Said sensor is disposed preferably on a production line 3 of the material K along which the bulk material or the solid body K is transported. The second microwave sensor 30 is operatively connected to the controlling and evaluating facility 20, and the controlling and evaluating facility 30 is configured to calibrate the second microwave sensor 30 on the basis of the dielectric constant of the sample P measured by the microwave measuring facility 15.

The controlling and evaluating facility 20 is further configured to determine the moistness of the material K on the basis of the dielectric constant $D_{mess2}$ measured online previously by the second microwave sensor 30.

Additionally, the controlling and evaluating facility 20 is configured to validate the moistness on the basis of the dielectric constant $D_{mess2}$ measured by the second microwave sensor 30. For this purpose the moistness determined by the first microwave sensor 10 and the moistness determined by the second microwave sensor 30 are compared.

Figure 2:
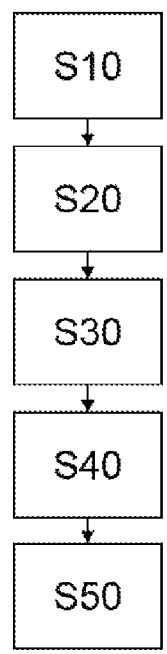
FIG. 2 shows a schematic representation of a method in the form of a flow diagram for determining the moistness of material, in accordance with the embodiment of FIG. 1.

FIG. 2 shows a schematic representation of a method for determining the moistness in accordance with the embodiment of FIG. 1. The method of the invention serves for determining the moistness of the material K and comprises the following steps:

First of all, in a first step S10, the material K is referenced with the referencing device 5. This is accomplished by determining the moistness of the sample P of the material K as a function of the mass of the sample P.

Thereafter, in a further step S20, the dielectric constant $D_{Probe}$ of the sample P is determined—S20—as a function of the moistness. This is accomplished by the microwave measuring facility 15.

Subsequently, as a next step S30, the first microwave sensor 10 is calibrated on the basis of the dielectric constant $D_{Probe}$ of the sample P.

Thereafter, as a next step S40, the dielectric constant $D_{mess1}$ of the material K is measured online by means of the first microwave sensor 1.

Lastly, as a step S50, the moistness of the material K is determined—S50—on the basis of the dielectric constant $D_{mess1}$ measured online previously.

This is accomplished by the controlling and evaluating facility 20.

As already observed above, the referencing device is disposed offline, and so the step of referencing the material with a referencing device (5) takes place offline.

Figure 3:
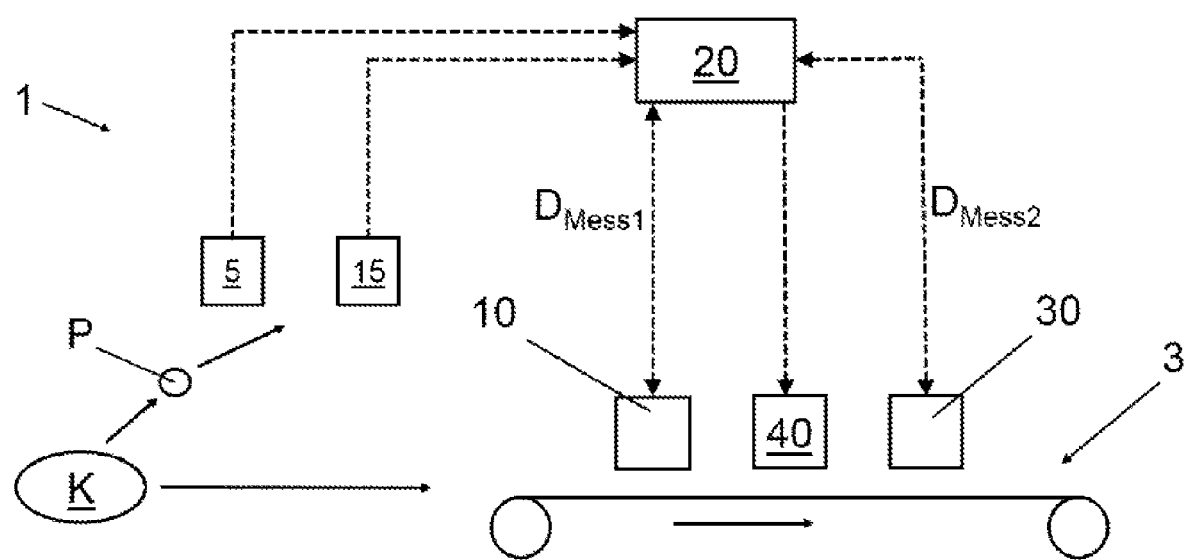
FIG. 3 shows a schematic representation of a device for determining the moistness of a material according to another embodiment of the invention.

FIG. 3 shows a further working example of the device 1, which is based on the device of FIG. 1 and additionally has a second microwave sensor 30. Optionally a microwave drying device 40 is designed for drying the material K, and is disposed preferably online between the first microwave sensor 10 and the second microwave sensor 30.

The second microwave sensor 30 measures the dielectric constant $D_{Mess2}$ of the material K online and is disposed preferably on a line downstream of the first microwave sensor. Thereafter the controlling and evaluating facility 20 determines the moistness of the material K on the basis of the measured dielectric constants $D_{Mess1}$, $D_{Mess2}$.

On the basis of this dielectric constant $D_{Mess2}$ obtained by the second microwave sensor 30, the moisture content of the material K is redetermined.

On the basis of the two measured moisture content values, the moisture content of the material K is validated. The controlling and evaluating facility 20 configured to carry out such validation. For this purpose, it compares the first and second dielectric constants $D_{Mess1}$ and $D_{Mess2}$ measured online. In this way the first and second moisture content values determined are placed in relation to one another—that is, compared.

If there is no microwave drying device 40 disposed between the first the first microwave sensor 10 and the second microwave sensor 30, the moisture content values measured ought to be the same. Therefore, the controlling and evaluating facility 20 compares the two measured moisture content values to that effect.

If there is a microwave drying device 40 disposed between the first the first microwave sensor 10 and the second microwave sensor 30, the moisture content value measured later ought to correspond to a mandated setpoint value. Accordingly, the controlling and evaluating facility 20 compares the measured value with the setpoint value.

If the value measured for the moisture content is different from the setpoint value, the microwave drying device 40 may be controlled or regulated as a function of the difference and/or of the value measured prior to the drying.

Figure 4:
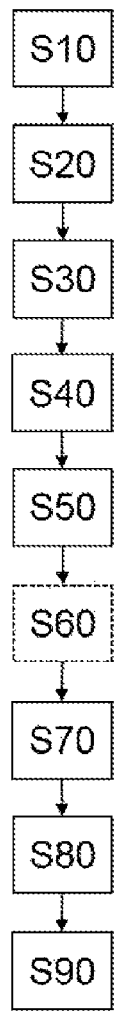
FIG. 4 shows a schematic representation of a method in the form of a flow diagram for determining the moistness of material, in accordance with the embodiment of FIG. 3.

FIG. 4 shows a schematic representation of a method flow for determining the moistness in accordance with the embodiment of FIG. 3. The method is based on the method represented in FIG. 2. Steps S10 to S50 of the method according to FIG. 4 correspond to the steps of the method of FIG. 2.

This method has the step S70, as a step following the step S50, of an online measuring of the dielectric constant $D_{mess2}$ of the material K by means of the second microwave sensor 30.

Subsequently, as a next step S80, there is a redetermining of the moistness of the material (K) on the basis of the dielectric constant $D_{mess2}$ measured online previously.

The method further comprises, as subsequent step S90, a validating of the moistness on the basis of the dielectric constant $D_{mess2}$ measured by the second microwave sensor 30.

Optionally, furthermore, there may be a step S60, between steps S50 and S70, in which the material K is dried by means of the second microwave sensor 30.

FIG. 5 shows a schematic representation of a microwave measuring unit 15, which is designed as a vector network analyzer. Vector network analyzers of this kind are produced by various manufacturers, via which they may be purchased.

Figure 6:
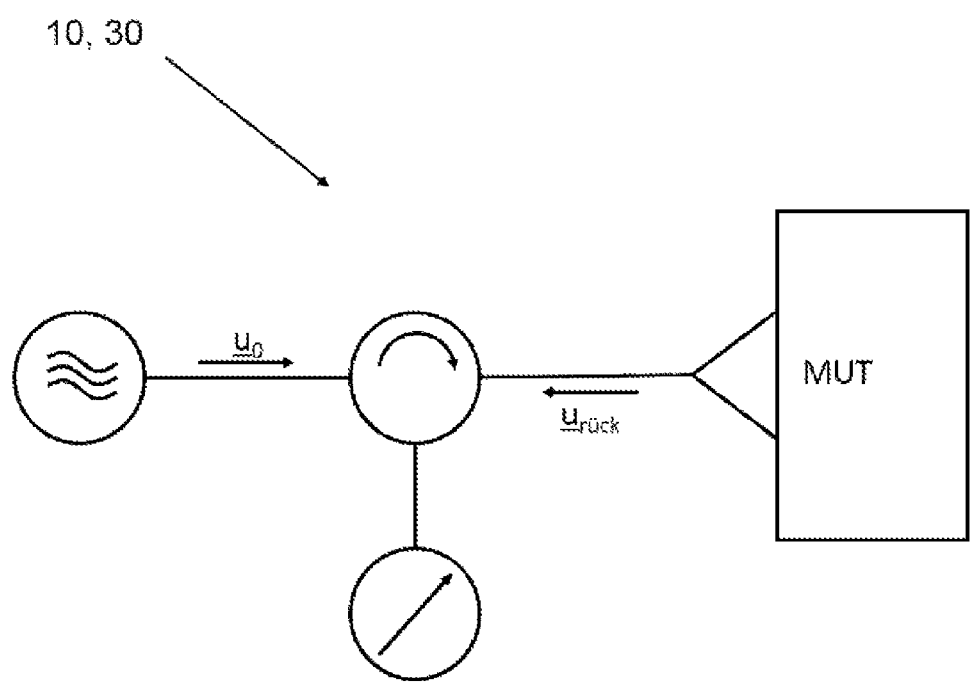
FIG. 6 shows a schematic representation of a resonant microwave sensor.

FIG. 6 shows a schematic representation of a resonant microwave sensor 10, which is designed as a resonant 1-port sensor. In this case the electromagnetic waves irradiated into the material and the waves reflected by the material are measured. The reflection factor measured is a measure of the dielectric properties of the material M. By means of a resonant 1-port sensor it is possible effectively to realize penetration depths of up to 30 cm, and moisture content measurement in the volume of the material is possible.

Figure 7:
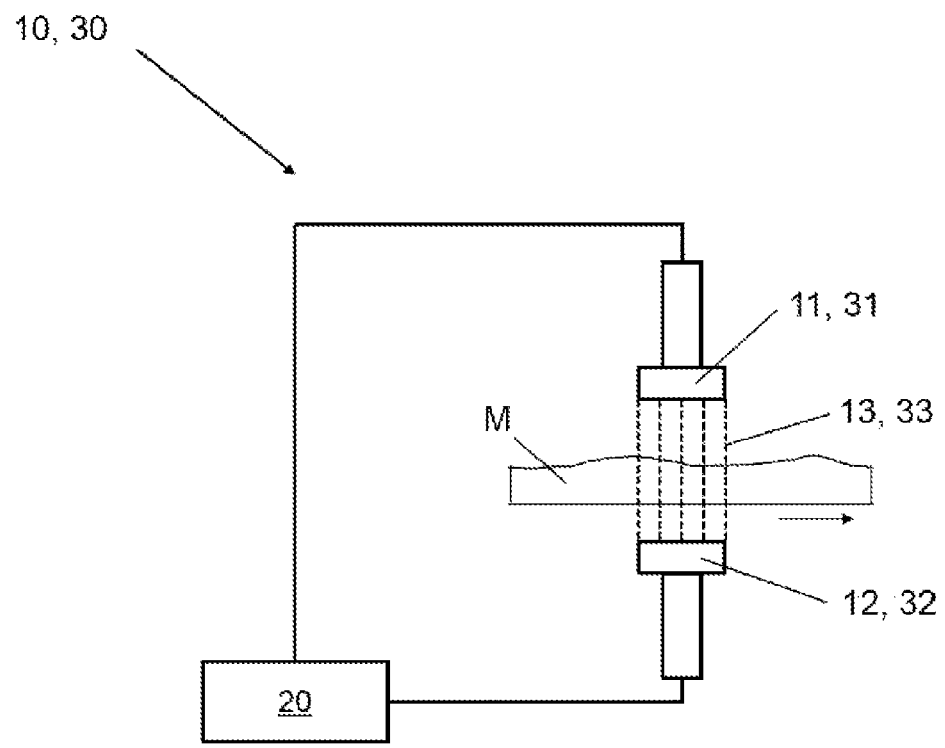
FIG. 7 shows a schematic representation of a transmitting microwave sensor.

FIG. 7 shows a schematic representation of the first and second microwave sensors 10', 30', which are each designed as a transmitting microwave sensor 10', 30', more particularly as a transmitting 2-port sensor. A transmitting microwave sensor 10', 30' of this kind has a microwave emitter 11, 31 and a microwave receiver 12, 32, which are installed, for example, above and below a conveying section for the material M.

In this way it is possible as described above to verify the moisture content of a continuous flow of the material M.

Furthermore, a system of this kind may have an optional sensor for compensation of spacing.

LIST OF REFERENCE SYMBOLS 1 device
3 production line
5 referencing device
10 first microwave sensor
15 microwave measuring facility
20 controlling and evaluating facility
30 second microwave sensor
40 microwave drying device
$D_{Probe}$ dielectric constant of the sample
$D_{mess2}$ dielectric constant measured by the first microwave sensor
$D_{mess2}$ dielectric constant measured by the second microwave sensor
K bulk material or solid body
P sample

What is claimed is:

1. A method for determining the moistness of a pyrotechnic and/or explosive substance, comprising the following steps:
    referencing a pyrotechnic and/or explosive substance with a referencing device by determining the moistness of a sample of the pyrotechnic and/or explosive substance as a function of the mass of the sample;
    determining the dielectric constant of the sample as a function of the moistness;
    calibrating a first microwave sensor, on the basis of the dielectric constant of the sample;
    measuring the dielectric constant of the pyrotechnic and/or explosive substance online by means of the first microwave sensor; and
    determining the moistness of the pyrotechnic and/or explosive substance on the basis of the dielectric constant measured online previously.

2. The method of claim 1, wherein the method further comprises the following steps:
    measuring the dielectric constant of the pyrotechnic and/or explosive substance online by means of a second microwave sensor; and
    redetermining the moistness of the pyrotechnic and/or explosive substance on the basis of the dielectric constant measured online previously.

3. The method of claim 2, wherein the method further comprises the following step:

validating the moistness on the basis of the dielectric constant measured by the second microwave sensor.

4. The method of claim 2, wherein the method further comprises the following step:

drying the pyrotechnic and/or explosive substance between the step of determining the moisture content of the pyrotechnic and/or explosive substance and the online measuring of the dielectric constant of the pyrotechnic and/or explosive substance by means of the second microwave sensor.

5. The method of claim 1, wherein the dielectric constants are permeability and/or permittivity.

6. The method of claim 1, wherein the step of referencing the pyrotechnic and/or explosive substance with a referencing device takes place offline.

7. A drying method comprising the method for determining the moistness of the pyrotechnic and/or explosive substance of claim 1, wherein a drying facility is controlled or regulated on the basis of the moistness determined for the pyrotechnic and/or explosive substance.

8. A device for determining the moistness of a material pyrotechnic and/or explosive substance, comprising a referencing device for referencing a pyrotechnic and/or explosive substance by determining the moistness of a sample of the pyrotechnic and/or explosive substance as a function of the mass of the sample;

a microwave measuring facility for determining the dielectric constant of the sample as a function of the moistness; and a controlling and evaluating facility which is configured to calibrate a first microwave sensor on the basis of the dielectric constant of the sample, the first microwave sensor disposed online for measuring the dielectric constant of the pyrotechnic and/or explosive substance, wherein the controlling and evaluating facility is further configured to determine the moistness of the pyrotechnic and/or explosive substance on the basis of the dielectric constant measured online previously.

9. The device of claim 8, wherein the device has a second microwave sensor disposed online for measuring the dielectric constant of the pyrotechnic and/or explosive substance, and the controlling and evaluating facility is configured to determine the moistness of the pyrotechnic and/or explosive substance on the basis of the dielectric constant measured online previously.

10. The device of claim 8, wherein the controlling and evaluating facility is configured to validate the moistness.

11. The device of claim 9, further comprising a microwave drying device for drying the pyrotechnic and/or explosive substance, said microwave drying device being disposed online between the first microwave sensor and the second microwave sensor.

12. The device of claim 8, wherein the dielectric constants are permeability and/or permittivity.

13. The device of claim 8, wherein the referencing device for referencing the pyrotechnic and/or explosive substance is disposed offline.

14. A drying device for drying a pyrotechnic and/or explosive substance, wherein the drying device comprises the device for determining the moistness of the pyrotechnic and/or explosive substance of claim 8, wherein a drying facility is set up to be controlled or regulated on the basis of the moistness determined for the pyrotechnic and/or explosive substance.

* * * * *